3,799,903
PROCESS FOR MAKING MACROSPHERICAL THERMOSET RESIN PARTICLES AND PRODUCT THEREOF
Daniel J. Najvar, Lake Jackson, Tex., assignor to The Dow Chemical Company, Midland, Mich.
No Drawing. Filed Feb. 7, 1972, Ser. No. 224,306
Int. Cl. C08f 45/04, 45/24
U.S. Cl. 260—29.6 M                  20 Claims

ABSTRACT OF THE DISCLOSURE

Macrospherical thermoset resin particles which may have an organic agent such as a biocidal material dispersed therein are prepared by curing a polyphase mixture of a thermosettable resin phase, an aqueous phase, a resin miscible effect agent when desired and certain inorganic materials.

BACKGROUND OF THE INVENTION

Vinyl ester resins when combined with water readily self-emulsify to form stable water-in-resin emulsions which may be cured to form a thermoset resin matrix having droplets of water dispersed therein. The mulsions are stable and are capable of holding a variety of fillers such as kaolin clays and the like without breaking or inverting the emulsion. The aqueous phase also may contain a variety of soluble organic and inorganic materials without breaking or inverting the emulsion.

SUMMARY OF THE INVENTION

It has now been found that when certain inorganic materials are present, either by addition to the water-in-resin emulsion or by being present when the resin phase and aqueous phase are mixed together, that a polyphase mixture results which upon curing produces an aqueous slurry of macrospherical thermoset resin particles. The resin phase may also contain as a portion thereof a resin miscible inert organic agent which results in a macrospherical particle having the organic agent dispersed therein.

Certain proportions of the components are necessary in order to obtain macrospherical particles rather than a solidified mass. The weight ratio of the aqueous phase to the resin phase should range from about 4:1 to 1:2. The weight ratio of the inorganic material to the resin phase should range from about 0.15:1 to 1:1, respectively. The resin phase may contain up to 50 weight percent of a resin miscible organic agent.

Useful inorganic materials include lead oxide, iron oxide, carbonates of Group II metals and sulfates of Group II metals. The thermosettable resin phase contains a catalytic amount of a free radical catalyst and when no organic agent is present comprises from about 40 to 70 weight percent of a thermosettable vinyl ester resin and about 60 to 30 weight percent of a copolymerizable monomer. The vinyl ester resin is prepared by reacting about equivalent amounts of a vinyl monocarboxylic acid with a polyepoxide.

DESCRIPTION OF THE INVENTION

The macrospherical particles of this invention are generally spherical and may range from soft to very hard particles. As such, said particles have a variety of uses such as organic fillers for other resin systems or bulking agents. However, when the macrospherical particles have an organic agent such as a biocidal material dispersed therein their utility is enhanced and they are especially useful as a means to slowly release the biocidal material and protect it against environmental degradation until released. It is thus possible to more efficiently and effectively utilize the biocidal material. Typical uses would include the addition to latex and latex paints for preservative purposes, incorporation into foundations for termite control and in sewer pipe for root control, spraying onto water or ground for control of mosquitos and the like, addition to recirculating water systems for maintenance of water and system quality or in a myriad of other applications determined in large measure by the nature of the particular organic agent and its intended purposes.

The present invention is to be contrasted to techniques of applying similar agents such as the control of spray drift by employing aqueous insecticidal gels (see, e.g., U.S. 3,253,985 and U.S. 3,253,984). Another known method involves an encapsulation technique wherein a polymeric sheath is formed around small droplets of oily materials such as is described in U.S. 2,969,331, U.S. 2,800,457 and others.

Basically, the process comprises two steps. first, a polyphase mixture is prepared by combining a resin phase, an aqueous phase and certain inorganic materials and then the polyphase mixture is cured through free radical polymerization initiated by various peroxides such as benzoyl peroxide. If the polyphase mixture is prepared by combining the aqueous and resin phases first, a water-in-resin emulsion is readily formed which upon addition of the inorganic material then inverts to a resin-in-water type of emulsion. Since the inorganic materials are essentially insoluble in either liquid phase their addition results in a polyphase mixture. Alternately, it has been found that the three components can be mixed in any convenient order to produce the polyphase mixture. It is preferred to add the organic agent to the resin phase before the polyphase mixture is prepared.

Once the polyphase mixture has been obtained continued stirring is not necessary. Slow agitation during the curing step is not necessary but may be beneficial in obtaining a more uniform particle size. To insure proper formation of the macrospheres and acceptable cure rates it is advantageous to employ a temperature of about 40° F. to 150° F. and preferably a temperature of 60–90° F. The mere addition of a cure accelerator, such as N,N-dimethylaniline, to the polyphase mixture is sufficient to cause an exotherm and rapidly cure the polyphase mixture.

After curing, the macrospherical product slurry may be employed directly without recovering said particles, post cured or dried. The slurry may be further diluted, if desired, and sprayed if the macrospheres contain an insecticide, for example, or the slurry may be directly added to a latex paint if the macrospheres contain a fungicide or bactericide or the like. Alternately the slurry may be water washed and/or given an acid wash to recover the macrospherical particles. Excess water may be removed by drying in any convenient manner.

Particle size of the macrospherical particles may be varied depending on the speed and shear employed in making the polyphase mixture and on the proportions of the components in said mixture. Smaller particle size is favored by increasing the shear and vice versa; lower amounts of the inorganic material favors larger particles. Particles as small as 5 to 10 microns and as large as 3/8" may be prepared.

Generally, the macrospherical particles have an average particle size ranging from about 10 to 250 microns. The density of the macrospherical particles may be increased by the addition of lead compounds, iron dust, small amounts of kaolin clay, magnesium or aluminum dust, and the like. The particles may also be pigmented by the addition of same.

It is to be understood that the macrospherical particles of this invention may contain small amounts of the inorganic material and/or droplets of the water phase.

In addition to employing certain inorganic materials in the preparation of the polyphase mixture, the proportions of the components of said mixture are also important in determining whether the macrospherical particles will form properly in the mixture or whether the mixture will cure to a solid mass. If an insufficient amount of the inorganic material is used either the macrospherical particles do not form or else those which do form are bonded together; if too much is used the polyphase mixture is "dry" and difficult to handle. Likewise, an insufficient amount of water also causes bonding together of the particles which form and results in a solid mass upon curing. Excess water does not appear to hinder formation of the macrospherical particles. For reasons of process economics and the like amounts of water above the 4:1 (water:resin) weight ratio may be used. Macrospherical particle formation is hindered if the amount of resin is too great.

The resin phase may be comprised entirely of about 40 to 70 weight percent of a polymerizable vinyl ester resin and about 60 to 30 weight percent of a copolymerizable monomer. The vinyl ester resin is prepared by reacting about equivalent amounts of a vinyl monocarboxylic acid with a polyepoxide, i.e. about one mole of said acid per each epoxide group. The preparation of such resins is described in various patents including U.S. 3,066,112; U.S. 3,179,623; U.S. 3,301,743; and U.S. 3,377,406 which are incorporated by reference herein.

A typical resin prepared by reacting two moles of acrylic acid with a diglycidyl ether of bisphenol A would have the following formula:

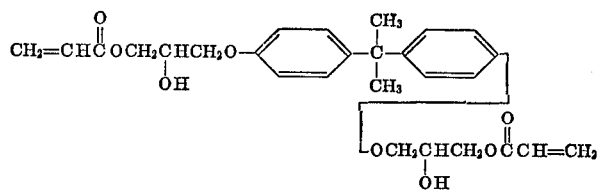

In addition to acrylic acid other vinyl monocarboxylic acids such as methacrylic acid, halogenated acrylic or methacrylic acids, cinnamic acid and the like may be employed to prepare the resin.

Any of the known polyepoxides may be employed in the preparation of the vinyl ester resins of this invention. Useful polyepoxides are glycidyl polyethers of both polyhydric alcohols and polyhydric phenols, flame retardant epoxy resins based on tetrabromo bisphenol A, epoxy novolaks, epoxidized fatty acids or drying oil acids, epoxidized diolefins, epoxidized di-unsaturated acid esters as well as epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having weights per epoxide group of about 140 to 2000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group per molecule, i.e. a 1,2-epoxy equivalency greater than one.

Suitable monomers include vinyl aromatic compounds such as styrene, vinyl toluene, halogenated styrenes, divinyl benzene and the like; saturated alcohols such as methyl, ethyl, isopropyl, octyl, etc. esters of acrylic acid or methacrylic acid; vinyl acetate, diallyl maleate, dimethallyl fumarate; mixtures of the same and all other monomers which are capable of copolymerizing with the vinyl ester resin.

A free radical catalyst is preferably added to the resin phase prior to preparing the polyphase mixture. A variety of well known catalysts are readily available and include such catalysts as benzoyl peroxide, lauroyl peroxide, t-butyl hydroperoxide, methyl ethyl ketone peroxide, t-butyl perbenzoate, potassium persulfate and the like. The amount of the catalyst added will vary preferably from 0.1 percent to about 5 percent by weight of the polyphase mixture.

A modified vinyl ester resin may also be employed as the resin phase wherein the vinyl ester resin, such as one shown in the formula above, is further reacted with up to about one mole (or slight excess thereof) of a dicarboxylic acid anhydride per equivalent of hydroxyl. Such modified vinyl ester resins and their preparation are fully described in U.S. 3,564,074.

Suitable dicarboxylic acid anhydrides containing ethylenic unsaturation include maleic anhydride, the halogenated maleic anhydrides, citraconic anhydride, itaconic anhydride and the like and mixtures thereof. Saturated dicarboxylic acid anhydrides include phthalic anhydride, tetrabromophthalic anhydride, chlorendic anhydride, anhydrides of aliphatic unsaturated dicarboxylic acid and the like. The modified vinyl ester resin is utilized in this invention in the same manner as already described for the unmodified vinyl ester resin. Mixtures of the two resins may also be employed.

The aqueous phase may also contain minor amounts of glycols and other water soluble organic or inorganic solvents. The inorganic materials necessary to the formation of the polyphase mixture and the macrospherical particles are selected from the group consisting of lead oxide, iron oxide, carbonates of Group II metals such as calcium carbonate, magnesium carbonate, barium carbonate and the like and sulfates of Group II metals such as calcium sulfate.

In order to accelerate the curing of the polyphase mixture it is preferred to add thereto promoters or accelerating agents such as lead or cobalt naphthenate, N,N-dimethyl aniline, N,N-dimethyl-p-toluidine, and the like usually in amounts of about 0.1 to 2 percent based on the weight of the mixture. The promotor should not be added until the preparation of the polyphase mixture has been completed to avoid any premature curing of the resin phase.

Advantageously, the resin phase may also comprise up to about 50 percent by weight of a resin miscible inert organic agent. In order to remain in the resin phase of the polyphase mixture the organic agent must also, of course, be water immiscible so that when the polyphase mixture is cured the organic agent remains dispersed in the macrospherical particle. The term inert is used only in the sense the organic agent is inert to polymerization with the resin system. The organic agent, itself, may be very active and useful compounds such as biocidal materials which are used in agriculture, disease control, preservation against destructive organisms and the like. Typical of such materials are bactericides, insecticides, pesticides, fungicides and the like.

The organic agent is not limited to biocidal materials but includes most any agent which has a useful property or activity such as flame retardant materials, antioxidants, fluorescing materials, heat and light stabilizers as well as polymeric materials such as rubber and the like.

Incorporation of the organic agent into the macrospherical particle also protects it against environmental degradation and prolongs its useful life until released from the particle. Thus the organic agent is more efficiently and effectively employed for its particular purpose. For example, bactericides or other similar preservatives which may lose their activity rapidly in an aqueous system may be effectively employed in latex paints and other aqueous formulations by incorporating the bactericide into a macrospherical particle.

EXAMPLES

The following non-limiting examples will further illustrate the process and products of this invention. All parts and percentages are by weight unless otherwise specified.

Example 1

A vinyl ester resin was prepared by reacting two equivalents of methacrylic acid, 1 equivalent of a glycidyl polyether of bisphenol A having an epoxide equivalent weight (EEW) of 475–575 (D.E.R. 661) and 1 equivalent of a glycidyl polyether of bisphenol A having an EEW of 186–192 (D.E.R. 331). The vinyl ester resin is then modified by reacting it with 3% maleic anhydride, following which it is diluted with styrene monomer to contain about 45% styrene.

A water-in-oil emulsion was first prepared by mixing 1000 gms. of the resin/styrene mixture, 15 gms. of benzoyl peroxide and 1000 gms. of water in a Cowles dissolver to form a smooth white emulsion. To this emulsion was added with mixing 1000 gms. of calcium carbonate and 5 gms. of N,N-dimethyl aniline as a polymerization accelerator to form a polyphase mixture.

In about 10 minutes the polyphase mixture exothermed to 146° F. but the curing of the mixture did not form a solid mass. After cooling the resulting slurry could be washed, filtered to remove the water and dried, producing a fine powder composed of individual macrospherical particles of cured resin. Similar results are obtained if the calcium carbonate, water and resin are all mixed together to form a polyphase mixture and then cured by addition of the accelerator.

When the above example was repeated except that the calcium carbonate was replaced by a kaolin clay, it was found that the addition of the accelerator to cure the mixture resulted in a solid rather than the formation of macrospherical particles.

Example 2

A vinyl ester resin was prepared by reacting 4 equivalents of methacrylic acid, 3 equivalents of an epoxy novolac having an EEW of 175–182 (D.E.N. 438) and 1 equivalent of D.E.R. 331 until the acid (—COOH) content was about 1%, indicative of completion of reaction. The resin was then mixed with styrene monomer (60:40, resp.) and used according to this invention with various amounts of calcium carbonate to form polyphase mixtures which were subsequently cured. The components of said mixtures and the resulting particle size of the macrospherical particles are shown below.

|  | Polyphase mixture | | | | | | |
|---|---|---|---|---|---|---|---|
|  | 1 | 2 | 3 | 4 | 5 | 6 | 7 |
| Components, grams: | | | | | | | |
| Resin/monomer | 1,000 | 1,000 | 1,000 | 1,000 | 1,000 | 1,000 | 1,000 |
| Water | 1,000 | 1,000 | 1,000 | 1,000 | 1,000 | 1,150 | 1,000 |
| Benzoyl peroxide | 15 | 15 | 15 | 10 | 15 | 15 | 15 |
| $CaCO_3$ | 100 | 140 | 200 | 200 | 160 | 160 | 1,000 |
| N,N-dimethyl aniline | 4 | 4 | 4 | 2 | 4 | 4 | 4 |
| Particle size: | | | | | | | |
| Maximum | (1) | 3/8″ | 1/4″ | 1/4″ | 3/8″ | 3/8″ | 500μ |
| Minimum | | 100 | 50 | 50 | 100 | 100 | 5μ |
| Average [2] | | .04″ | .01″ | .01″ | .04″ | .04″ | 200μ |

[1] No macrospherical particles were formed.
[2] 90% in average range.

The results show that lower levels of the inorganic material, $CaCO_3$, produce larger macrospherical particles and that the lower limit is about 0.15 pts. of $CaCO_3$ to 1 part of the resin phase.

Example 3

Employing a resin similar to that of Example 1 a polyphase mixture was prepared wherein the resin phase contained a resin miscible fungicide [2,3,5,6-tetrachloro-4-(methylsulfonyl)pyridine]. The polyphase mixture was prepared from 1000 gms. of said fungicide, 1000 gms. of vinyl ester resin (containing about 45% styrene), 1000 gms. of water, 1000 gms. of $CaCO_3$, 20 gms. of benzoyl peroxide and 5 gms. of N,N-dimethyl aniline. After curing by allowing the mixture to exotherm, macrospherical particles from 5 to 300μ containing the fungicide were produced.

After screening for uniform particle size the macrospherical particles were added to an acrylic latex paint having a pH of 9.6 in an amount such that the level of fungicide was approximately equal to the concentration of pure fungicide added to another batch of the same latex paint. The fungicide, itself, hydrolyzes quite readily and accordingly has limited utility in such a system. However, accelerated aging testing of the above latexes at 140° F. at zero, six weeks and six months showed no tendency for the pH to drift or loss in activity of the fungicide for the latex containing said particles whereas the control latex (i.e. pure fungicide) lost about ½ of its activity in 6 weeks and the remainder before the end of the 6 months. Thus, a fungicide which had little practical utility because of hydrolysis was rendered useful and more efficient. The latex paint was an emulsion polymer of 68 parts butyl acrylate, 28 parts α-methyl styrene and 4 parts of methacrylic acid which was reacted with a sufficient amount of ethylenimine to convert about one-half of the acid groups to aminoethyl ester groups.

Example 4

In a manner similar to Example 1 and 3 macrospherical particles containing an insecticide [o,o-diethyl-o-(3,4,6-trichloro)-2-pyridyl phosphothioate] were prepared. The polyphase mixture was prepared from 100 pts. of a resin similar to Example 1, 100 pts. of water, 35 pts. of said insecticide, 50 pts. of $CaCO_3$, 2 pts. of benzoyl peroxide and 0.5 pt. of N,N-dimethyl aniline.

The resulting macrospherical particles were stored under water to simulate environmental exposure conditions and were periodically checked for their ability to kill mosquito larvae. After 8 months of such testing the particles still provides 100% larvae kill. Under similar conditions the insecticide, itself, has only a 2 week 100%-kill life at which time it becomes ineffective.

Example 5

In a similar manner macrospherical particles containing a systemic oral pesticide (4-t-butyl-2-chlorophenyl methyl methyl phosphoramidate) used to kill grubs, flies, worms, etc. which infect livestock were prepared from three different polyphase mixtures with the components shown below and a resin similar to Example 1.

|  | Polyphase mixture | | |
|---|---|---|---|
|  | 1 | 2 | 3 |
| Components, grams: | | | |
| Resin | 1,000 | 1,000 | 1,000 |
| Pesticide | 16 | 40 | 80 |
| Water | 1,000 | 1,000 | 1,000 |
| $CaCO_3$ | 600 | 600 | 600 |
| Benzoyl peroxide | 15 | 15 | 15 |
| N,N-dimethyl aniline | 2 | 2 | 2 |

Each of the mixtures when cured resulted in macrospheres which were 5 to 250μ in diameter and which contained the pesticide.

Example 6

A vinyl ester resin was prepared by reacting 1 equivalent of methacrylic acid with 1 equivalent of glycidyl polyether of a polyglycol having an EEW of 364–380 (D.E.R. 741) and diluting with styrene (60/40).

Soft macrospherical particles were prepared from this resin by curing a polyphase mixture containing 1000 pts. water, 1000 pts. resin, 1000 pts. $CaCO_3$ and 0.5% benzoyl peroxide and 0.2% N,N-dimethyl aniline to exotherm the mixture.

By the addition of 400 pts. of the fungicide of Example 3 to a similar polyphase mixture as prepared above, soft macrospherical particles containing the fungicide dispersed therein were prepared which were useful as a latex paint preservative.

Example 7

A master water-in-resin emulsion was prepared from a vinyl ester resin, obtained by reacting 2 equivalents of methacrylic acid, 1 equivalent of D.E.R. 331 and 1 equivalent of D.E.N. 438, by combining and mixing on a Cowles dissolver 15 lbs. of the resin with 15 lbs. of water and 100 gms of benzoyl peroxide.

Then, 1000 gm. portions of this master emulsion were mixed with 200 grams of various inorganic materials and cured by the addition of 0.2% N,N-diethyl aniline to exotherm the mixture. The results are tabulated below:

| Inorganic material: | Cured form of mixture |
|---|---|
| Calcium phosphate | Hard solid. |
| Calcium silicate | Do. |
| Potassium carbonate | Do. |
| Calcium carbonate | Macrospherical particles (fine powder). |
| Barium carbonate | Macrospherical particles (very fine powder). |
| Magnesium carbonate | Macrospherical particles (fine powder). |
| Calcium sulfate | 1/16 to 1/2" polymer spheres. |
| Lead oxide ($PbO_2$) | Macrospherical particles (fine powder). |
| Iron oxide (yellow) | Do. |
| Lead chloride | High density solid. |
| Lead sulfate | Do. |

In any of the previous examples acrylic acid may be used in place of methacrylic acid. Portland cement was also effectively employed in place of pure $CaCO_3$.

It will be understood that the present invention is not limited to the specific details above but may embody various modifications insofar as they are defined in the following claims.

What is claimed is:

1. A process for preparing a slurry of macrospherical thermoset resin particles which comprises
   (a) making a polyphase mixture by combining
      (1) a thermosettable resin phase containing a catalytic amount of a free radical catalyst,
      (2) an aqueous phase in proportions such that the weight ratio of the aqueous phase to the resin phase ranges from about 4:1 to 1:2, respectively, and
      (3) an inorganic material in proportions such that the weight ratio of said inorganic material to said resin phase ranges from about 0.15:1 to 1:1 wherein the inorganic material is lead oxide, iron oxide, a carbonate of a Group II metal or a sulfate of a Group II metal; and
   (b) curing said mixture;
      wherein said resin phase comprises about 40 to 70 weight percent of a vinyl ester resin prepared by reacting about equivalent amounts of a vinyl monocarboxylic acid with a polyepoxide and about 60 to 30 weight percent of a copolymerizable monomer.

2. The process of claim 1 wherein said resin phase further contains a water immisicible inert organic agent which is miscible with the resin phase in amounts such that said effect agent comprises up to about 50 percent by weight of the resin phase.

3. The process of claim 1 wherein said vinyl monocarboxylic acid is acrylic acid or methacrylic acid.

4. The process of claim 1 wherein said vinyl ester resin is further reacted with up to about 1 mole of a dicarboxylic acid anhydride per each hydroxyl group formed by the interaction of said acid with each epoxide group of the polyepoxide.

5. The process of claim 1 wherein said resin phase further contains a water immiscible, resin miscible biocidal material in amounts such that the boicidal material comprises up to about 50 weight percent of the resin phase.

6. A slurry of macrospherical particle prepared according to the process of claim 1.

7. A slurry of macrospherical particle prepared according to the process of claim 2.

8. A slurry of macrospherical particle prepared according to the process of claim 3.

9. A slurry of macrospherical particle prepared according to the process of claim 4.

10. A slurry of macrospherical particle prepared according to the process of claim 5.

11. A process for preparing macrospherical thermoset resin particles according to claim 1 wherein said particles are recovered from the slurry.

12. A process for preparing macrospherical thermoset resin particles according to claim 2 wherein said particles are recovered from the slurry.

13. A process for preparing macrospherical thermoset resin particles according to claim 3 wherein said particles are recovered from the slurry.

14. A process for preparing macrospherical thermoset resin particles according to claim 4 wherein said particles are recovered from the slurry.

15. A process for preparing macrospherical thermoset resin particles according to claim 5 wherein said particles are recovered from the slurry.

16. A macrospherical particle prepared according to the process of claim 11.

17. A macrospherical particle prepared according to the process of claim 12.

18. A macrospherical particle prepared according to the process of claim 13.

19. A macrospherical particle prepared according to the process of claim 14.

20. A macrospherical particle prepared according to the process of claim 15.

References Cited

UNITED STATES PATENTS

| 3,373,075 | 3/1968 | Fekete et al. | 161—185 |
| 3,564,074 | 2/1971 | Swisher et al. | 260—837 |

MORRIS LIEBMAN, Primary Examiner

J. H. DERRINGTON, Assistant Examiner

U.S. Cl. X.R.

260—29.6 TA, 29.6 MM, 29.7 H, 29.7 M, 41, 836, 837; 424—78

UNITED STATES PATENT OFFICE
CERTIFICATE OF CORRECTION

Patent No. 3,799,903          Dated March 26, 1974

Inventor(s) Daniel J. Najvar

It is certified that error appears in the above-identified patent and that said Letters Patent are hereby corrected as shown below:

Column 1, line 24, the word "mulsions" should be --emulsions--.

Column 5, in the Table, under the heading "6", the second figure "1,150" should be --1,500--.

Signed and sealed this 27th day of -August 1974.

(SEAL)
Attest:

McCOY M. GIBSON, JR.          C. MARSHALL DANN
Attesting Officer             Commissioner of Patents